US007724652B2

(12) United States Patent
Banerjee et al.

(10) Patent No.: US 7,724,652 B2
(45) Date of Patent: May 25, 2010

(54) METHOD OF REDUCING NETWORK CONGESTION

(75) Inventors: Dwip N. Banerjee, Austin, TX (US); Venkat Venkatsubra, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 309 days.

(21) Appl. No.: 11/970,994

(22) Filed: Jan. 8, 2008

(65) Prior Publication Data
US 2009/0175167 A1 Jul. 9, 2009

(51) Int. Cl.
*H04L 12/26* (2006.01)
(52) U.S. Cl. ....................................... 370/218; 370/400
(58) Field of Classification Search ................. 370/219, 370/229, 231, 232, 235, 237, 389, 397, 400; 709/234, 235, 238, 239, 241, 243
See application file for complete search history.

(56) References Cited

U.S. PATENT DOCUMENTS

| 5,313,454 | A | * | 5/1994 | Bustini et al. | 370/231 |
| 5,347,450 | A | * | 9/1994 | Nugent | 709/243 |
| 5,649,108 | A | * | 7/1997 | Spiegel et al. | 709/241 |
| 5,787,071 | A | * | 7/1998 | Basso et al. | 370/231 |
| 6,075,769 | A | * | 6/2000 | Ghanwani et al. | 370/229 |
| 2005/0157641 | A1 | * | 7/2005 | Roy | 370/218 |
| 2005/0180415 | A1 | * | 8/2005 | Cheung et al. | 370/389 |
| 2006/0115015 | A1 | * | 6/2006 | Oh et al. | 375/267 |

\* cited by examiner

*Primary Examiner*—Kwang B Yao
*Assistant Examiner*—Andrew Lai
(74) *Attorney, Agent, or Firm*—Dillon & Yudell LLP

(57) ABSTRACT

In a method of reducing network congestion between a source computer and a destination computer, a receiving router receives a source quench message and determines whether originator of the source quench message is the destination computer or an intermediate router. If the receiving router determines the originator to be the destination computer, the receiving router forwards the source quench message to the source computer. If the receiving router determines the originator to be an intermediate router, the receiving computer determines if there is an alternative route from the receiving router to the destination computer. If the receiving router determines there is no alternative route from the receiving router to the destination computer, the receiving router forwards the source quench message to the source computer. If the receiving router determines there is an alternative route to the destination computer, the receiving router does not forward the source quench message to the source computer, and, going forward, routes packets to the destination computer by the alternative route.

6 Claims, 2 Drawing Sheets

METHOD OF REDUCING NETWORK CONGESTION

BACKGROUND OF THE INVENTION

1. Technical Field

The present invention relates in general to the field of computer networking, and more particularly to a method of reducing network congestion by using Internet Control Message Control (ICMP) Source Quench information to update routing protocols dynamically.

2. Description of the Related Art

Routing packets from a source computer to a destination computer forms the bedrock of the Internet. At the Internet Protocol (IP) layer, routing is the critical mechanism through which data is sent. At any point in the path, routers pick the next router or destination to which for the packet, based on an entry in the routers routing table. Routing is truly a distributed protocol However, with the exploding growth of the Internet, the bandwidth available has not been able to keep up with rising number of users and it is quite possible to encounter congestion. When the resources of a router or destination computer are being stretched by buffer overflow, bandwidth limitations, and the like, to router or destination computer needs a mechanism to inform others about its condition.

The Internet Control Message Protocol (ICMP) is used to communicate control information for the Internet at the network layer. If a router or destination computer experiences congestion, it can send an ICMP Source Quench message to the source computer, asking the source computer to slow down. The source computer can use this information to reduce its data rate. However, when the congestion is at the router rather than the destination computer, the destination computer may be well able to handle the original data rate.

SUMMARY OF THE INVENTION

Embodiments of the present invention provide a method of reducing network congestion between a source computer and a destination computer. When a router receives a source quench message, the receiving router determines whether originator of the source quench message is the destination computer or an intermediate router. If the receiving router determines the originator to be the destination computer, the receiving router forwards the source quench message to the source computer. However, if the receiving router determines the originator to be an intermediate router, the receiving router determines if there is an alternative route from the receiving router to the destination computer. If the receiving router determines there is no alternative route from the receiving router to the destination computer, the receiving router forwards the source quench message to the source computer. However, if the receiving router determines there is an alternative route to the destination computer, the receiving router does not forward the source quench message to the source computer. Going forward, the receiving router routes packets to the destination computer by the alternative route.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
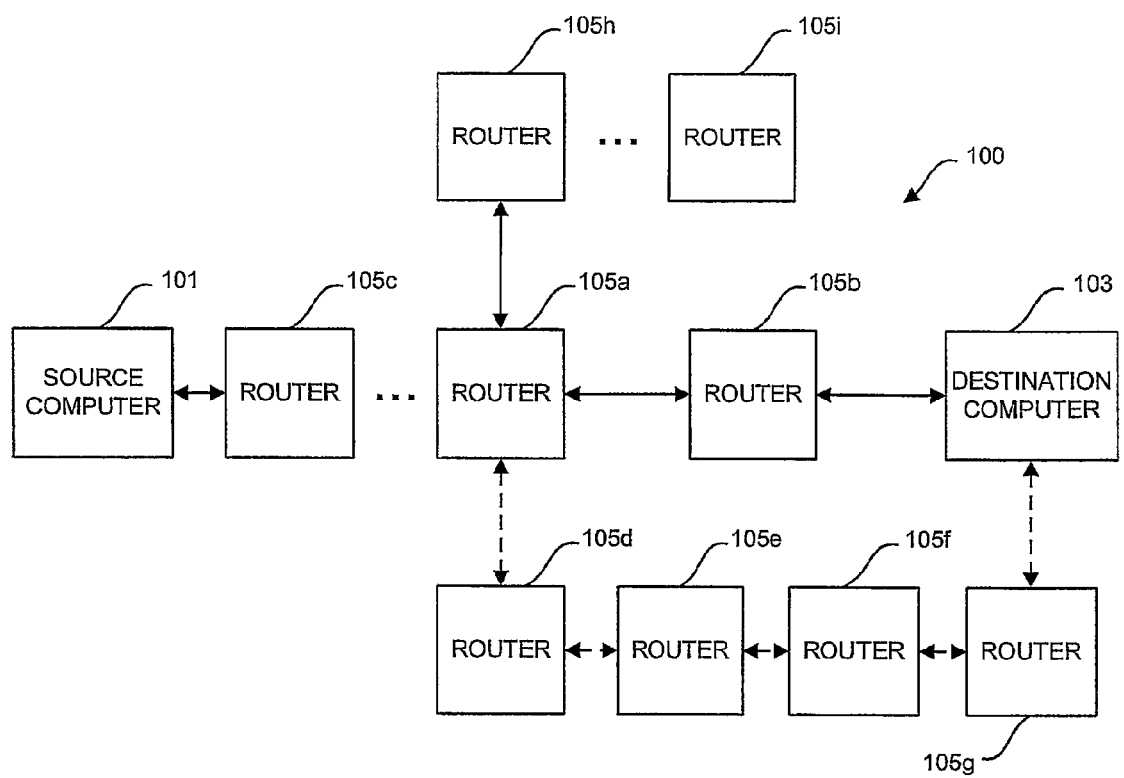
FIG. 1 is a block diagram of an embodiment of a network according to the present invention; and, FIG. 2 is a flow chart of an embodiment of receiving router processing according to the present invention.

Referring now to drawings, and first to FIG. 1, a network is designated generally by the numeral 100. Network 100 is preferably and Internet Protocol (IP) network. Network 100 includes a source computer 101 and a destination computer 103. Computers 101 and 103 may be a suitable information handling systems such as personal computers, large servers, and the like.

Computers 101 and 103 communicate with each other by sending messages and packets or datagrams back and through a system of routers 105. Each router 105 receives messages and packets and processes or forwards them according to routing tables. In the embodiment of FIG. 1, source computer 101 communicates directly with router 105c. Router 105c forwards packets intended for destination computer 103 to router 105a, possibly through one or more intermediate routers. Router 105a is a boundary router for a subnetwork. When router 105a receives a packet intended for destination computer 103, its routing table tells it to forward the packet to intermediate router 105b, which in turn forwards the packet to destination computer 103.

Router 105a may also forward packets to routers 105d and 105h. As shown in FIG. 1, routers 105d-105g form an alternate route from router 105a to destination computer 103. However, according to the routing protocol implemented in network 100, router 105a routes packets intended for destination computer 103 to router 105b rather than to router 105d.

For any of the various reasons, destination computer 103 or router 105b may be unable to handle packets or datagrams received at a certain rate. For example, destination computer 103 may be overwhelmed by datagrams from many sources, such as popular website being swamped by HTTP requests. Source computer 101 and destination computer 103 may be exchanging information, but source computer 101 may be a much faster machine that can generate outgoing and process incoming dating grams much faster than destination computer 103 can. Router 105b may be receiving a large number of datagrams over a high-speed link that it needs to forward to destination computer 103 over a low-speed link.

When destination computer 103 or router 105b is unable to handle incoming datagrams from source computer 101, destination computer 103 or router 105b sends an Internet Control Message Protocol (ICMP) Source Quench message to source computer 101. According to the present invention, and as will be explained in detail hereinafter, when router 105a receives the source quench message it determines if the originator of the message is destination computer 103 or router 105b. If the originator of the message is destination computer 103, router 105a forwards the message to source computer 101. However, if router 105b is the originator of the message, router 105a updates its routing table to forward datagrams intended for destination computer 103 to router 105d rather than router 105b and does not forward the source quench message to source computer 101.

Figure 2:
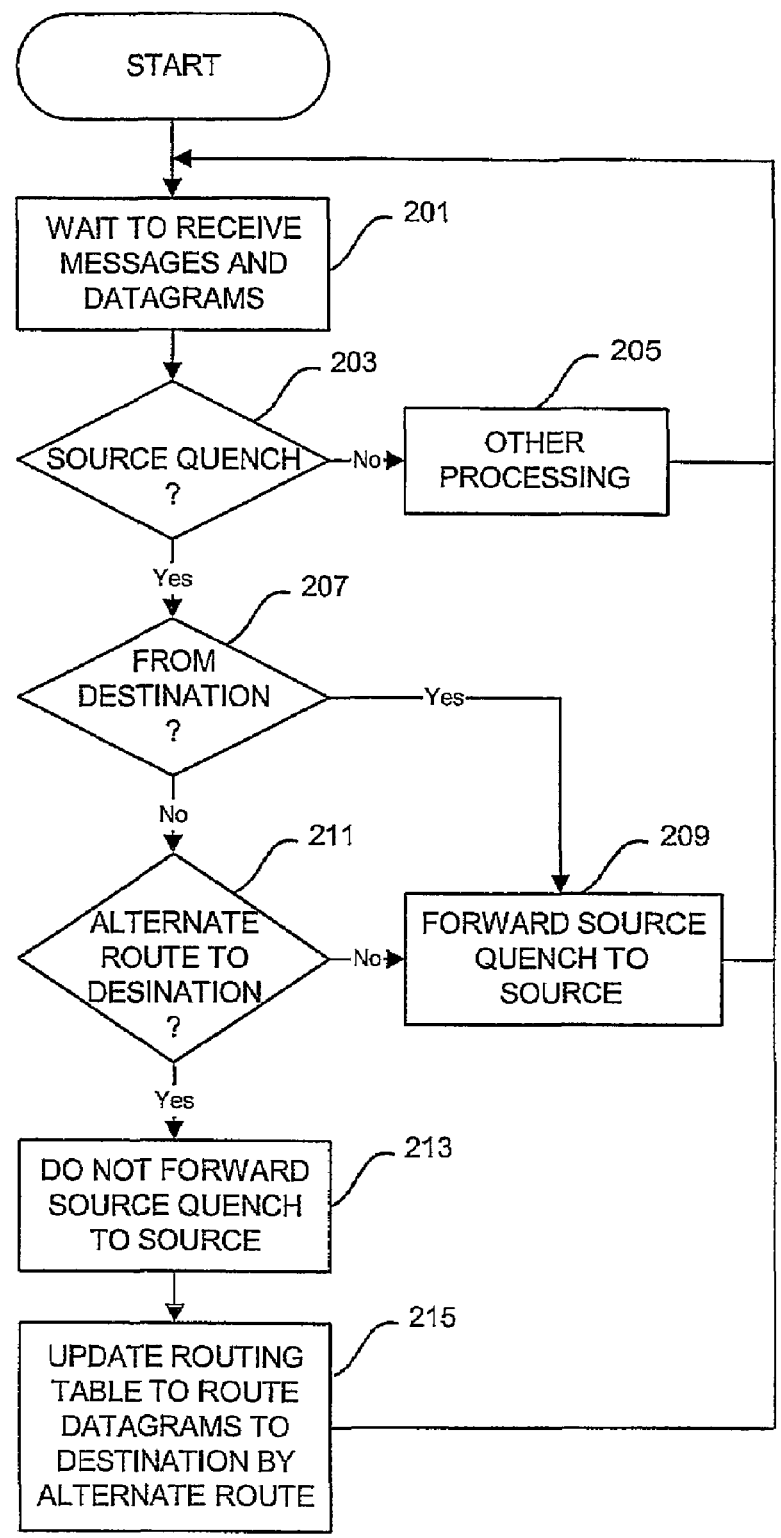

FIG. 2 is a flow chart of receiving router processing according to the present invention. The receiving router waits to receive messages send datagrams, as indicated at block 201. The receiving router determines, at decision block 203, if it receives a source quench message. If not, the receiving router performs other processing, as indicated generally at block

205. If the receiving router receives a source quench message, the receiving router determines, at decision block 207, if the originator of the source quench message is the destination computer. If so, the receiving router forwards the source quench message to the source computer, as indicated at block 209. If the originator of the source quench message is not the destination computer, which indicates that the originator is a router, the receiving router determines, at decision block 211, if there is an alternate route to the destination. If not, the receiving router forwards the source quench message to the source, as indicated at block 209. If, as determined at decision block 211, there is an alternate route to destination, the receiving router does not forward the source quench message to the source, as indicated at block 213. As indicated at block 215, the receiving router updates its routing table throughout datagrams to the destination computer by the alternate route. Going forward, the receiving router will route datagrams to the destination via the alternate route.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A method of reducing network congestion between a source computer and a destination computer, which comprises:
    receiving a source quench message from an originator to said source computer at a receiving router;
    determining if said originator is an intermediate router;
    if said originator is an intermediate router, determining if there is an alternative route from said receiving router to said destination computer; and,
    if there is an alternative route to said destination computer, routing packets to said destination computer by said alternative route.

2. The method as claimed in claim 1, further comprising:
    if there is an alternative route to said destination computer, not forwarding said source quench message to said source computer.

3. The method as claimed in claim 1, further comprising:
    if said originator is determined not to be a router, forwarding said source quench message to said source computer.

4. The method as claimed in claim 1, further comprising:
    if said receiving router determines there is no alternative route from said receiving router to said to destination computer, forwarding said source quench message to said source computer.

5. The method as claimed in claim 1, wherein said routing packets to said destination computer by said alternative route includes updating a routing table of said receiving computer.

6. A method of reducing network congestion between a source computer and a destination computer, which comprises:
    receiving a source quench message from an originator to said source computer at a receiving router;
    determining whether said originator is said destination computer or an intermediate router;
    if said originator is determined to be said destination computer, forwarding said source quench message to said source computer;
    if said originator is determined to be an intermediate router, determining if there is an alternative route from said receiving router to said destination computer;
    if said receiving router determines there is no alternative route from said receiving router to said destination computer, forwarding said source quench message to said source computer;
    if said receiving router determines there is an alternative route to said destination computer, not forwarding said source quench message to said source computer and updating a routing table for said receiving router to route packets to said destination computer by said alternative route.

* * * * *